United States Patent
Safran et al.

(10) Patent No.: US 6,814,443 B2
(45) Date of Patent: Nov. 9, 2004

(54) IMAGE PROJECTION SYSTEM AND ITS METHOD OF USE

(75) Inventors: Allan Safran, Dol-des-Ormea (CA); Warren Stelman, Dol-des-Ormea (CA); Trent Martin, Montreal (CA)

(73) Assignee: Digital Advertising Network Inc, Montreal (CA)

( * ) Notice: Subject to any disclaimer, the term of this patent is extended or adjusted under 35 U.S.C. 154(b) by 0 days.

(21) Appl. No.: 10/125,680

(22) Filed: Apr. 18, 2002

(65) Prior Publication Data

US 2003/0058416 A1 Mar. 27, 2003

(51) Int. Cl.$^7$ ............................................. G03B 21/26
(52) U.S. Cl. ......................................... 353/30; 353/94
(58) Field of Search ........................... 353/94, 30, 119; 359/460

(56) References Cited

U.S. PATENT DOCUMENTS

| | | | | |
|---|---|---|---|---|
| 2,898,804 A | * | 8/1959 | Ragan | 353/30 |
| 3,749,484 A | * | 7/1973 | Busche | 353/30 |
| 4,468,092 A | * | 8/1984 | Inoue et al. | 359/457 |
| 4,866,530 A | | 9/1989 | Kalua | |
| 5,426,531 A | * | 6/1995 | Tsukagoshi | 359/457 |
| 5,580,145 A | * | 12/1996 | Yamada et al. | 353/74 |
| 5,902,030 A | * | 5/1999 | Blanchard | 353/30 |
| 6,540,366 B2 | * | 4/2003 | Keenan et al. | 353/79 |
| 6,561,651 B1 | * | 5/2003 | Kubota et al. | 353/30 |
| 6,568,816 B2 | * | 5/2003 | Mayer et al. | 353/94 |
| 2002/0048001 A1 | * | 4/2002 | Fujimori | 353/119 |
| 2002/0067439 A1 | * | 6/2002 | Mayer et al. | 348/744 |
| 2002/0071101 A1 | * | 6/2002 | Horbaschek et al. | 353/28 |

FOREIGN PATENT DOCUMENTS

| | | |
|---|---|---|
| CA | 2079790 A1 | 10/1991 |
| CA | 2128108 A1 | 8/1993 |
| CA | 2297981 A1 | 1/1999 |
| CA | 2149552 C | 2/1999 |
| CA | 2343747 A1 | 1/2000 |

* cited by examiner

Primary Examiner—W. B. Perkey
(74) Attorney, Agent, or Firm—Christensen O'Connor Johnson Kindness PLLC

(57) ABSTRACT

The present invention provides a projection system for the display of images in a wide range of ambient light conditions. The system comprises a system control component, two or more projectors and a screen unit. The system control component synchronizes two or more images for projection by the projectors, with the image synchronization enabling the generation of a coherent single image from multiple projected images. There are two or more projectors which project separate images and each projector projects an image onto a unique area of a screen unit. The synchronization of the projectors is also controlled by the system control component. The screen unit has one or more screens for receiving the projected images and these screens are compatible with a rear projection system. The screens incorporate a contrast enhancing component which improves the resistance of the projected image to contrast degradation due to a wide range of ambient light conditions.

11 Claims, 2 Drawing Sheets

IMAGE PROJECTION SYSTEM AND ITS METHOD OF USE

FIELD OF THE INVENTION

The present invention pertains to the field of image projection systems and in particular to an image projection system for use in a wide range of ambient light conditions.

BACKGROUND

Due to the ubiquitous nature of advertising, video displays have become an attractive means to convey messages to the public in an interesting and eye-catching manner. Situated in public areas, these display units are typically simple to use and effective at attracting consumer attention. Video display systems currently in use are typically the traditional televisions or box-type projection screens, with these systems typically ranging from a depth of 24 to 120 inches. Many potential buyers consider these types of video display systems to be eyesores and inappropriate for small areas. In addition, these types of video displays may be difficult to install from existing ceiling supports due to their size. Plasma displays may be used for these video displays, however these types of displays are typically very expensive and are only available in limited sizes.

A common approach to create a single large image has been to use "video walls" which entail a plurality of screens placed together. Typically, a single video signal is stretched over the plurality of screens in order to create a single image. The difficulty with this type of procedure is that the resolution of a single video feed creating an increasingly larger image results in the loss of quality of the image. In addition, the screens used in this type application are typically enclosed by casings or covers and as such the separation between the adjacent screens creates a plurality of discontinuities or mullions within the image, which reduces the coherency of the image.

Presently, the typical aspect ratios of video display systems are 4:3 or 16:9, and as such in order to produce an image having an aspect ratio outside of the industry norm, the image is typically distorted to form an image having a different aspect ratio. This however does not typically result in a visually pleasing image since the image has been stretched in either the horizontal direction, vertical direction or both.

Canadian Patent Application No. 2,297,981 discloses a projection system in which two or more images are combined to form a composite image. The images are projected side by side onto a screen so that they partially overlap one another. The overlapped portions of the images correspond to one another and the light intensity in this overlap is manipulated or blended to create a seamless transition from one image to the other. The composite image is thus a larger or wider image with higher total resolution. This system overcomes the problem of aspect ratio and the deterioration of image quality due to the increasing of the image size. However, the blending of the overlapping portions of the images results in a system which is expensive due to the required technology for this blending procedure.

An additional problem with projection systems is the dramatic effect which ambient light has on the contrast of the created image. Ambient light conditions tend to "wash out" the contrast of the images, resulting in an image which is very poorly defined and difficult to see. Canadian Patent Application 2,128,108 discloses a front projection video display system which achieves high contrast without darkened room conditions by a specific combination and arrangement of polarising filters. This system is effective in rooms where there is normally one light source to control. However it is both expensive and difficult to implement in a large public area where there are normally numerous light sources, for example a shopping centre.

Canadian Patent Application No. 2,079,790 discloses a display that has improved contrast in various lighting conditions. The display which presents the image has enhanced contrast based on its ability to switch between a bright, image-presenting state and a dark, image-less state. This procedure minimises the glare from ambient light reflections, thus enhancing the contrast of the resulting image.

In addition, Canadian Patent Application No. 2,149,552 discloses a display system suitable for high ambient light environments, wherein a lamp is used simply as a light source to illuminate a rear projection display screen. The display screen is a matrix of tiny cells that modulate the light at video rates. Each cell includes a polymer dispersed liquid crystal (PDLC), a focusing lens and a pinhole aperture. When the PDLC is electrically activated, light passing through the PDLC is scattered in many directions and very little light passes through the pinhole aperture limiting what is seen by the viewer. When the PDLC is not electrically activated, light passing through the PDLC is not scattered and the lens of each cell focuses the light through the pinhole aperture hence the viewer sees a bright spot of light.

Each of the above screen designs are capable of reducing the affect of ambient light on the quality of the projected image however, each of these systems require additional components to operate the functionality of the screen itself, in addition to an image creation system, which makes these types of systems expensive.

Therefore there is a need for a projection system which can create images beyond the standard aspect ratio, can be installed in a wide range of ambient light conditions, is inexpensive and is visually appealing.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide an image projection system and its method of use. In accordance with an aspect of the present invention, there is provided a projection system for the display of images in a wide range of ambient light conditions comprising: a system control means for synchronising two or more images for projection by projection means, wherein said synchronisation of the two or more images provides a means for the generation of a coherent single image; two or more projection means for projecting images, wherein each projection means projects an image onto a unique area of a screen unit, wherein synchronisation of said projection means is controlled by the system control means; and a screen unit comprising one or more screens for receiving the projected images, wherein said one or more screens are compatible with a rear projection system and wherein said one or more screens incorporate a contrast enhancing means which improves the resistance of the projected image to contrast degradation due to a wide range of ambient light conditions, wherein a region separating said projection means and said screen unit is not enclosed.

In accordance with another aspect of the invention, there is provided a projection system for the display of images in a wide range of ambient light conditions comprising: a system control means for synchronising three or more images for projection by projection means, wherein said synchronisation of the images provides a means for the generation of a coherent single image and wherein said system control means stores a plurality of images and sequence information; a screen unit comprising three screens compatible with a rear projection system, wherein said screens have a thickness of less than one inch, wherein said screens are positioned side by side to form the screen unit having a perimeter, wherein the perimeter of the screen unit is enclosed by a frame having a thin profile, wherein each screen receives a projected image from a particular projection means and wherein said screens incorporate a contrast enhancing means which improves the resistance of the projected image to contrast degradation due to a wide range of ambient light conditions; and three projection means for projecting images, wherein said projection means are installed approximately twice the projected width behind the screen unit, wherein each projection means is encased in a protective enclosure and wherein the synchronisation of said projection means is controlled by the system control means, wherein said projection means and said screen unit are suspended from a ceiling and wherein a region separating said projection means and said screen unit is not enclosed.

DETAILED DESCRIPTION OF THE INVENTION

Definitions

The term "edge matching" is used to define a procedure for the creation of an original image by the alignment of a plurality of smaller images into which the original image had been divided. In accordance with this procedure the edges of adjacent images are matched such that they are aligned in a manner that produces the original single image. In addition, the adjacent sides of the smaller images do not overlap in order to produce the original single image.

The term "projected width" is used to define the width of an image projected by a particular projection means.

The term "projected height" is used to define the height of an image projected by a particular projection means.

The term "projected area" is used to define the area of an image projected by a particular projection means and can be determined by multiplying the projected width times the projected height of the image in question.

The term "image" is used to define a static or dynamic visual representation. An image may comprise a still picture, a sequence of pictures, or an animated, moving sequence of pictures, a Web interface (Web page) or any combination thereof.

The term "projection surface" is used to define the area upon which the projection means are creating the coherent image and may be a single screen or a collection of screens.

The term "synchronising" or "synchronisation" or "synchronise" is used to define the process by which compatible images are presented or projected at the same time. In this manner a large image that has been divided into a number of smaller images, can be viewed as a complete coherent image if each of the smaller images are presented or projected onto a screen at the same time.

Unless defined otherwise, all technical and scientific terms used herein have the same meaning as commonly understood by one of ordinary skill in the art to which this invention belongs.

The present invention provides a projection system for the display of images in a wide range of ambient light conditions comprising: a system control means for synchronising two or more images for projection by projection means, wherein said synchronisation of the two or more images provides a means for the generation of a coherent single image; two or more projection means for projecting images, wherein each projection means projects an image onto a unique area of a screen unit, wherein synchronisation of said projection means is controlled by the system control means; and a screen unit comprising one or more screens for receiving the projected images, wherein said one or more screens are compatible with a rear projection system and wherein said one or more screens incorporate a contrast enhancing means which improves the resistance of the projected image to contrast degradation due to a wide range of ambient light conditions; wherein a region separating said projection means and said screen unit is not enclosed.

Figure 1:
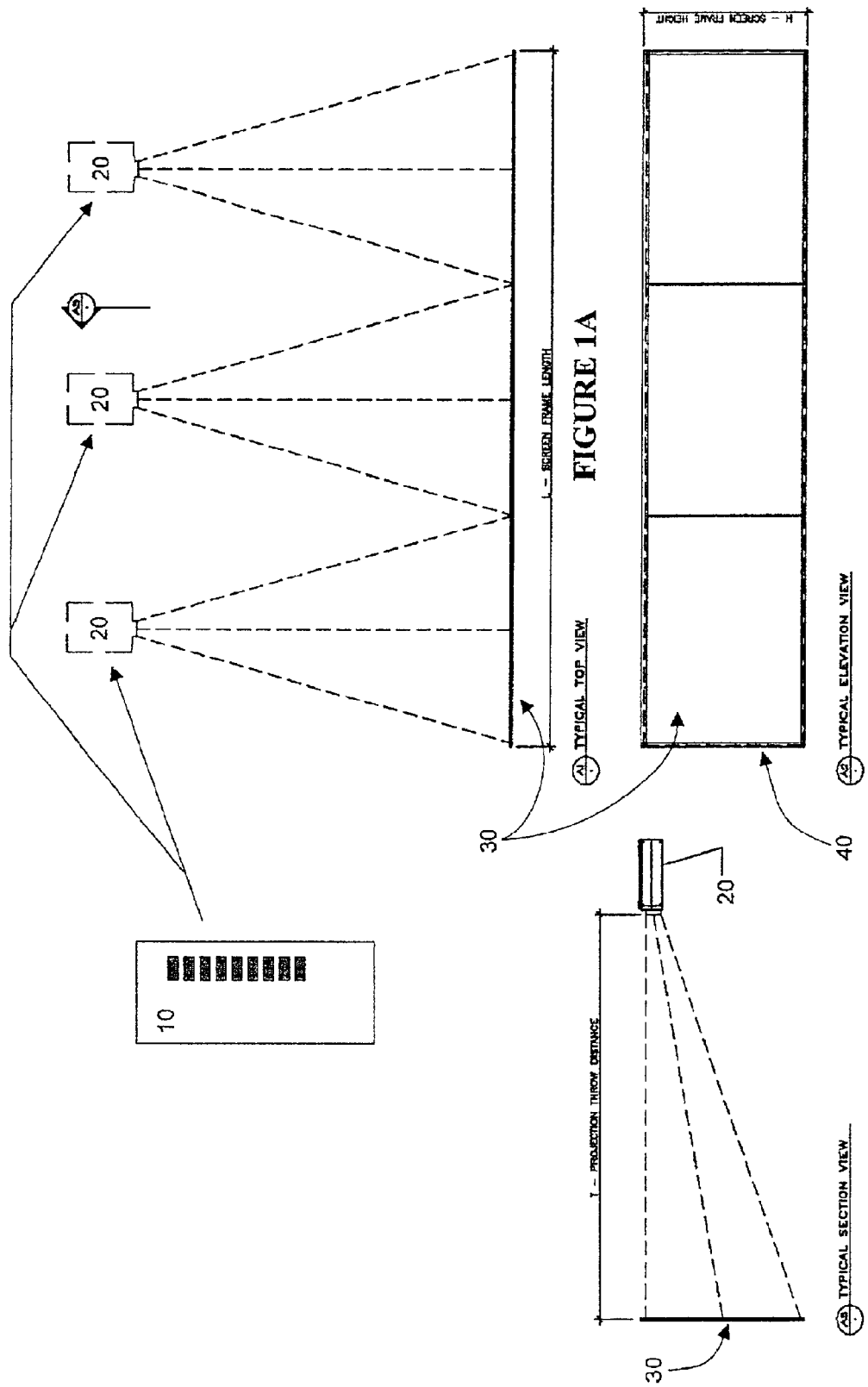
FIG. 1A provides a top view of one embodiment of the present invention.
FIG. 1B provides a section view of the embodiment according to FIG. 1A.
FIG. 1C provides a front elevation view of the embodiment according to FIG. 1A as seen from the front of the screen.

In one embodiment of the invention, as illustrated in FIGS. 1A and 1B, the region between the projection means and the screen unit, is not enclosed. The visible profile of the projection be system (FIG. 1B) comprises a projection means and a thin screen unit, wherein this profile of the projection system may be considered visually appealing and unobtrusive in comparison with a typical box type projection system which enclose this region.

With reference to FIGS. 1A, 1B and 1C, a projection system according to one embodiment of the present invention is illustrated. The projection system comprises a system control means 10, a plurality of projection means 20 and a screen unit 30 comprising one or more screens upon which a projected image can be received and presented to an audience. The functionality of each of these components of the present invention is presented in further detail below.

System Control Means

The system control means controls the functionality of the projection means. The system control means performs tasks comprising storing of a plurality of images for projection by the projection means, storing sequencing information and synchronising a plurality of images such that a collection of independently projected images forms a single coherent image.

The system control means may be any computing device which enables the storage of information and further comprises a software or other execution means for enabling the synchronisation of the plurality of projection means resulting in the generation of a coherent single image from a plurality of projected images.

In one embodiment of the present invention, the system control means stores the images to be projected and further contains sequence information relating to the sequence of the transmission of these images to the projection means.

This presentation sequence can be called a "play list" for the plurality of images which are stored on the system control means. The "play list" may comprise information relating to the date and time for the projection of a particular image in addition to the sequence of projection of the images. In one embodiment, a "play list" can be created wherein there is repetition of particular images, for example a particular image is displayed twice an hour and other images are only displayed once an hour. In one embodiment of the present invention, the system control means creates the "play list" based on defined parameters comprising but not limited to image display time, image display frequency and length of projection time provided for a particular "play list", for example.

In one embodiment of the present invention, the system control means may be accessed remotely using for example, a satellite connection or the Internet. This enables the stored images and sequence information to be amended or replaced by new images or sequence information in a remote manner. In this manner, a remotely located computing system can access a plurality of system control means of various projection systems installed at different locations.

In one embodiment of the present invention, the system control means can monitor the operational time of each of the components and current status of the system. For example, the operational time of the projectors and the bulbs of the projectors may be monitored. Through this type of monitoring activity logs and servicing logs for the system can be established. The remote access to the system control means further enables a plurality of projection systems to be monitored remotely from for example, a centralised location.

The system control means synchronises the projection of images by the projection means such that a plurality of individual images, upon projection onto a screen unit, forms a single coherent image. This coherent image can be created such that the seams or mullions between the independently projected images are virtually indistinguishable.

In essence the system control means is controlling the duty cycle of each projection means simultaneously such that compatible images are projected by the plurality of projection means at the same time thereby creating the impression of a single coherent image. In addition, images stored on the system control means have been appropriately sequenced and are identifiable such that the system control means is able to determine which images are to be projected by which projection means such that the coherent image can be created. The sequence for the generation of the appropriate images for each projection means, enabling the creation of a single coherent image, will be discussed in a further section.

Projection Means

The projection of the images onto a screen unit can be performed by any projection means that has the capability of modulating light such that desired images are created. Each projection means projects an image onto a unique area of the screen unit, wherein the addition of these separate images created on the multiple unique areas of the screen unit form a single coherent image. For example, DLP (digital light processing), LCD (liquid crystal display) or CRT (cathode ray tube) type projectors may be used as a projection means for the present invention.

In one embodiment, the projection means can be compatible with a rear projection type system. LCD projectors coded PLC-SU20N and PLC-SP20N, which are produced by Sanyo™, can be used as projection means according to one embodiment of the present invention.

In one embodiment of the present invention and with further reference to FIG. 1A, there are three projection means and three screens forming a screen unit incorporated into the projection system. Each projection means creates an image on the screen unit having a projected area which is equivalent to essentially one third of the entire projection surface of the screen unit, which is approximately equivalent to the area of one of the screens forming the screen unit. Based on present standards, the projected area of each image can have an aspect ratio of approximately 4:3, for example, and as such having three images side by side will result in the projected coherent image having an aspect ratio of approximately 4:1. It should be noted that an aspect ratio of 4:1 is approximately the same as that used for most advertising billboards and banners, which may enable advertisers to use the same advertisements for a billboard as for a projection system according to one embodiment of the present invention, therefore possibly resulting in monetary savings.

As would be appreciated by a worker skilled in the art, any number of projection means can be incorporated into the system of the present invention and a compatible screen unit or units can be provided to enable the display of the images created by the selected number of projection means.

In one embodiment of the present invention, the projection means can be provided with an activation/deactivation system which enables the projection means to commence projection and to discontinue projection during desired periods. In one embodiment, clocks and activation and deactivation times may be incorporated into the projection means enabling these devices to commence and cease projection at predetermined times. An activation/deactivation system may also comprise a motion or light detection system, wherein activation/deactivation of the projection means occurs when predetermined levels of motion or light are detected. For example if no motion is detected for a period of 20 minutes or the ambient light conditions are below a threshold value, deactivation of the projection means occurs.

In one embodiment of the present invention, the projection means are enclosed by an encasing means which can provide protection to the projection means in addition to possibly enhancing the visual aesthetics of the projection means. The encasing means is formed from material selected from the group comprising steel, aluminium or other alloy, fibreglass and carbon fibre. The selection of the material can be based on the required strength and stiffness of the encasing means, in addition to cost and availability of a particular material.

In one embodiment of the present invention, the projection means are installed approximately twice the projected width behind the screen unit. The relative spatial positioning of the projection means in relation to the screen unit can be adjusted as would be known to a worker skilled in the art of projection systems having regard to the characteristics of the projection means and the screen unit.

In one embodiment of the present invention, a line amplifier, located between the system control means and the projection means may be incorporated into the system in order amplify the signal being output by the system control means prior to reaching the projection means. A worker skilled in the art would understand the required steps and amplifier specifications required to enable this signal amplification.

Screen Unit

The screen unit is a screen or a collection of screens which provide a surface upon which the image is projected and can be compatible with a rear projection system. Furthermore the screen unit incorporates a contrast enhancing means which enables the projected image to be resistant to the effects of a wide range of ambient light conditions.

In one embodiment of the present invention, a screen which may form a screen unit and may be incorporated into the projection system is a wide angle screen, which enables an individual to view the projected image from almost any angle in front of the screen or over a range of up to approximately 180°. This provides a means for an audience to see the images from almost any position in front of the screen. For example, a screen which may be used in conjunction with the present invention is a wide-angle rear projection screen produced by Dai Nippon™. This screen has a collection of fresnel lenses on the backside for refracting the light through the screen and a collection of lenticular lenses on the front in order to produce a horizontal distribution of the previously refracted light.

A screen used in conjunction with one embodiment of the present invention further comprises a contrast enhancing means which may be in the form of a film, spray on solution or a dye which may be placed in or on the screen, in order to reduce the affect of ambient light conditions. By controlling the affect of ambient light, the projection system according to the present invention can be used in a plurality of venues where the direct control of ambient light may be difficult. The contrast enhancing means may absorb the ambient light or disperse the ambient light in a plurality of directions, thereby reducing the effect of ambient light on the perceived contrast of the image. In one embodiment of the present invention the contrast enhancing means can be a black acrylic screen material which is injected inside the screens.

In one embodiment of the present invention and with reference to FIG. 1C, a frame 40 is installed such that it surrounds the perimeter of the screen unit 30 which may provide a means for the screen unit to be installed at its viewing location. In the case of multiple screens forming the screen unit, a perimeter frame is constructed such that the separation between adjacent sides of the screens is as small as possible. This form of interconnection of a plurality of screens provides a means for almost eliminating the mullions between the adjacent screens thus enabling a coherent image to be projected onto the screen unit. The frame can be formed from any material which has appropriate stiffness and load carrying capacity such that the screen unit may be suspended using said frame. For example the frame may be formed from steel, aluminium or other alloy, carbon fibre or any other material meeting the criteria specified above.

In one embodiment of the present invention, the screens are less than one inch thick. In a further embodiment the screens are approximately 0.25 inches thick. The mullions or spaces separating adjacent screens can be approximately 0.375 inches thick and the frame enclosing the perimeter of the screen unit can be approximately one inch thick. This scale of dimensions for the screen unit, which is a combination of at least two individual screens, provides the screen unit with a streamline profile and may virtually eliminate the visible presence of mullions between the individual screens.

Sequence of Image Creation

In one embodiment, the sequence of events resulting in the generation of a single coherent image using the projection means of the present invention is defined below.

Initially, the final image to be displayed using the projection means is conceived as a single entity, wherein this image can be a static picture or a dynamic sequence of pictures. The final image to be displayed can further be a single picture which encompasses the entire projection surface or may be a combination of two or more images. This single entity is subsequently divided into a plurality of smaller images which is compatible with the set-up of the projection system. For example, with reference to FIG. 1A, there are three projection means creating the single entity image and as such the single entity image will be divided into three smaller images. It should be noted that adjacent smaller images do not overlap and as such the appropriate edges of adjacent images are matched in order to create the original single entity image.

Each smaller image corresponds to a particular portion of the single entity image and as such must be projected by the projection means that illuminates the corresponding portion of the screen unit. In addition, a sequence or "play list" of a plurality of single entity images can be established, enabling the sequential arrangement of the smaller images.

In one embodiment of the present invention, the sequential list of images to be projected by a particular projection means is formed into a video stream for transmission from the system control means to the appropriate projection means. This video stream may be in the form of a MPEG, MPEG2, MPEG4 or any other video format which is compressed or uncompressed. It should be noted that while the video stream for each projection means is separate from each other stream, each video stream establishes the images for only a portion of the single entity image. Therefore, it is essential that the timing of the presentation time of each image or frame in a video stream is synchronised with the compatible image or frame of the other video streams, in order that the compatible images are projected by the projection means at the same time in order to create the illusion of a single entity image on the screen unit. The images for transfer to the projection means may equally well be a sequence of still images which may be in the form of JPEGs or any other still image format which is compressed or uncompressed.

In one embodiment, the video streams are saved on the system control means and are subsequently transmitted to the appropriate projection means enabling the creation of the originally conceived single entity image by the plurality of projection means.

In one embodiment of the present invention, the above mentioned video streams may well be real time video feeds from for example, the Internet, or any other real time video stream source. Thus providing a means for the incorporation of real time information which would enable the display of, for example up to date stock prices, weather reports, sports or news information. Furthermore, the projection system according to one embodiment of the present invention can broadcast events which may be live or previously recorded from sources comprising cable, microwave or satellite feeds. In addition the projection system can display passive video feeds from sources comprising DVDs, VCRs or any other passive video source.

Installation of the Projection System

Figure 2:
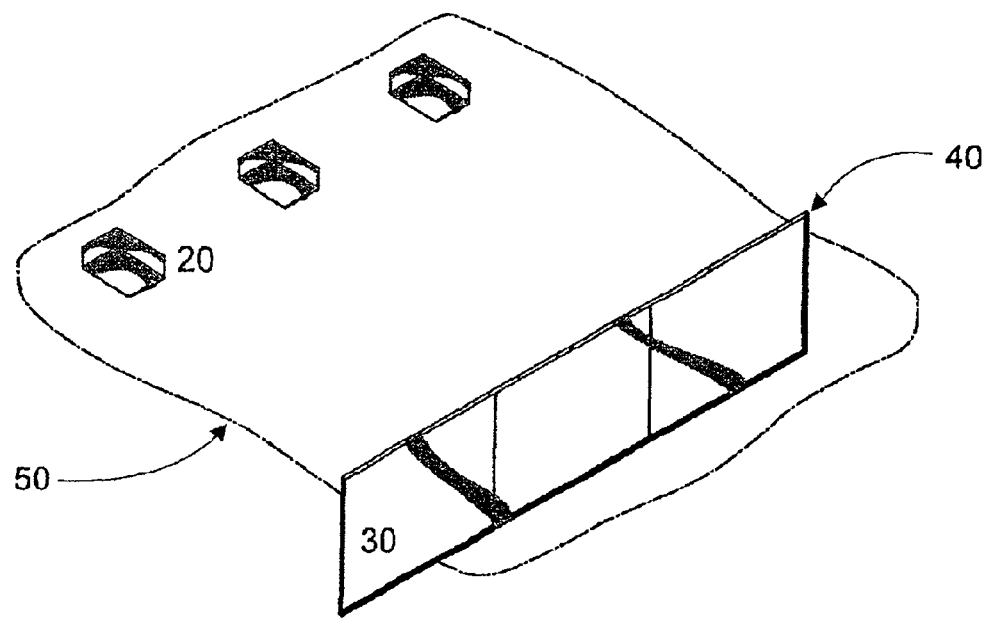
FIG. 2 provides a perspective view of one embodiment of the present invention as it may be installed at ceiling level.

In one embodiment of the present invention and with reference to FIG. 2, the projection system can be installed as illustrated, wherein the projection means and the screen unit are attached directly to the ceiling 50 of the area in which the system is being utilised. The system control means is hidden from view and is operatively connected with the projection means by use of cables or wires in a hardwired system or may equally well be connected by use of radio frequency waves in a wireless type system.

Figure 3:
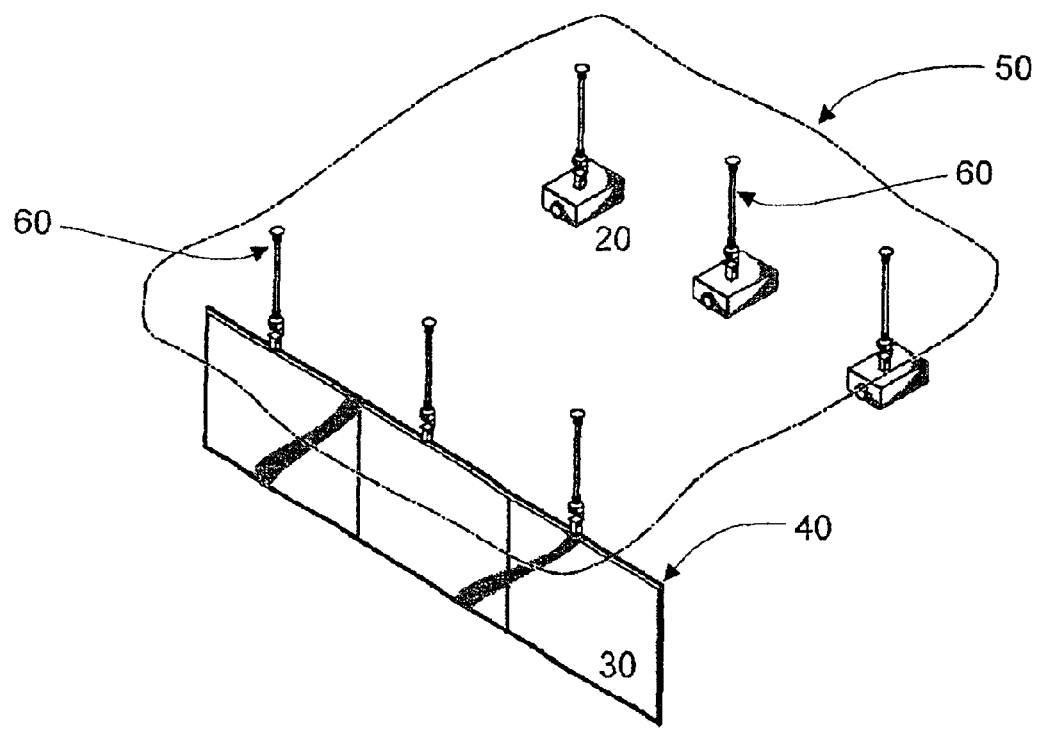
FIG. 3 provides another perspective view of a further embodiment of the present invention as it may be installed.

In a further embodiment of the present invention and with reference to FIG. 3, the projection means 20 and the screen unit 30 may be suspended from the ceiling 50 of the area in which it is being utilised by a connection rod system 60. The connection system 60 provides a means for the screen to appear suspended in mid-air, thus possibly adding to the visual attractiveness of the projection system. In one embodiment, the length and number of poles forming the connection rod system can be varied, wherein the selection of the type of the connection rod system may be dependent on the installation site of the projection system, for example.

In one embodiment, as illustrated in FIGS. 2 and 3, the projection means and the screen unit are not interconnected, leaving an open region separating these components, thus providing a system that may appear unobtrusive and streamlined to an audience. Furthermore, the desired image appears on the side of the screen unit opposite the projection means, thus this system may provide an illusion that the image on the screen unit is suspended in mid-air, since only the screen unit may be seen from this vantage point. Particularly, if the screen unit is suspended from the ceiling by an elongated connection system, as illustrated in FIG. 3, the audience's attraction to this displayed image may be enhanced.

A projection system according to one embodiment of the present invention may be inexpensive when compared to other projection systems due to the minimisation of the number of components of the system in addition to the ease of creation of the projected image from a plurality of smaller images. By using the method of edge matching, the projection system does not require additional functionality necessary to modulate light intensities in areas where the images overlap.

EXAMPLES

Example 1

Use of the Projection System as an Advertising Medium

The projection system of the present invention may be utilised as an advertising medium, for example, it may be installed in a shopping mall, airport, university or any other high consumer traffic area. In these types of assembly areas the projection system and thus the advertisements would be visible to a plurality of consumers and therefore possibly entice them into purchasing the items advertised.

This projection system can be installed in a shopping mall environment, for example in a food court, because the system has the ability to counteract the affects of the multiple sources of ambient light which are present in this type of setting. In addition, this ability to counteract the affect of ambient light enables the projection system to be installed without the need for a light barrier between the projection means and the screen(s) thus providing the system with a thin profile which may be visually appealing to the consumer audience (see FIGS. 1B and 2). In addition, the suspension of the projection system at a level removed from the ceiling may further enhance the visual presentation of the system since the projected image appears to be "floating" in mid-air (see FIG. 3).

The projection system according to one embodiment of the present invention further provides a means for sequencing a plurality of advertisements to be displayed in what may be called a "play list". The projection system provides a means for displaying advertisements which are still pictures, moving images or a combination thereof. This provides a means for one projection system to provide advertising for a plurality of advertisers which may enhance the visual display for the consumer because the images are constantly changing.

Example 2

Use of the Projection System as a Status Display Medium

The projection system of the present invention may be utilised as a status display medium. The projection system may be installed at an airport in order to display the current status of the flights, for example or at high traffic areas on a university campus in order to display daily news items and/or class modifications and cancellations.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The embodiments of the invention in which an exclusive property or privilege is claimed are defined as follows:

1. A projection system for display of images in a wide range of ambient light conditions comprising:

a) a system control means for synchronizing three or more images for projection by projection means, wherein said synchronization of the images provides a means for the generation of a coherent single image and wherein said system control means stores a plurality of images and sequence information;

b) a screen unit comprising three screens compatible with a rear projection system, wherein said screens have a thickness of less than one inch, wherein said screens are positioned side by side to form the screen unit having a perimeter, wherein the perimeter of the screen unit is enclosed by a frame having a thin profile, wherein each screen receives a projected image from a particular projection means and wherein said screens incorporate a contrast enhancing means which improves the resistance of the projected image to contrast degradation due to a wide range of ambient light conditions; and c) three projection means for projecting images, wherein said projection means are installed approximately twice the projected width behind the screen unit, wherein each projection means is encased in a protective enclosure and wherein the synchronization of said projection means is controlled by the system control means, wherein said projection means and said screen unit are suspended from a ceiling and wherein a region separating said projection means and said screen unit is not enclosed.

2. The projection system according to claim 1, wherein said suspension from the ceiling is provided by a connection rod system.

3. The projection system according to claim 1, wherein said projection means are selected from the group comprising: DLP projectors, LCD projectors and CRT projectors.

4. The projection system according to claim 3, wherein said projection means are LCD projectors.

5. The projection system according to claim 1, wherein said protective enclosure is formed from material selected from the group comprising: steel, aluminium or other alloy, fibreglass and carbon fibre.

6. The projection system according to claim 1, wherein the contrast enhancing means is selected from the group comprising: a film, a spray on solution and a dye.

7. The projection system according to claim 6, wherein the contrast enhancing means is a dye which is a black acrylic screen material.

8. The projection system according to claim 1, wherein said system control means stores a plurality of images and sequence information.

9. The projection system according to claim 1, wherein said system control means can be accessed in a remote manner which provides a means for remotely amending information contained on the system control means.

10. The projection system according to claim 1, wherein said two or more images for projection are in a video stream format.

11. The use of the projection system according to claim 1 an advertising medium.

* * * * *

UNITED STATES PATENT AND TRADEMARK OFFICE
CERTIFICATE OF CORRECTION

PATENT NO.   : 6,814,443 B2
DATED        : November 9, 2004
INVENTOR(S)  : A. Safran et al.

It is certified that error appears in the above-identified patent and that said Letters Patent is hereby corrected as shown below:

Title page,
Item [75], Inventors, "Dol-des-Ormea" should read -- Dol-Des-Ormea -- (both occurrences)

Signed and Sealed this

Tenth Day of May, 2005

JON W. DUDAS
*Director of the United States Patent and Trademark Office*